(12) United States Patent
Bondi et al.

(10) Patent No.: US 6,333,979 B1
(45) Date of Patent: *Dec. 25, 2001

(54) METHOD AND APPARATUS FOR ASSIGNING INCOMING COMMUNICATIONS TO COMMUNICATIONS PROCESSING CENTERS

(75) Inventors: Andre B. Bondi, Red Bank; Moshe Segal, Tinton Falls, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,668

(22) Filed: Dec. 17, 1998

(51) Int. Cl.[7] .............................. H04M 7/00; H04M 3/00
(52) U.S. Cl. ............... 379/219; 379/221.01; 379/220.01; 379/309; 379/265.01
(58) Field of Search .................................... 379/265, 266, 379/309, 219, 220

(56) References Cited

U.S. PATENT DOCUMENTS

| | | | |
|---|---|---|---|
| 4,620,066 | 10/1986 | Bushnell et al. | 179/27 D |
| 5,164,983 | 11/1992 | Brown et al. | 379/26 |
| 5,291,550 | 3/1994 | Levy et al. | 379/242 |
| 5,311,572 | 5/1994 | Friedes et al. | 379/67 |
| 5,335,268 | 8/1994 | Kelly, Jr. et al. | 379/112 |
| 5,384,841 | 1/1995 | Adams et al. | 379/266 |
| 5,530,744 | 6/1996 | Charalambous et al. | 379/265 |
| 5,546,452 | 8/1996 | Andrews et al. | 379/219 |
| 5,590,188 | * 12/1996 | Crockett | 379/225 |
| 5,754,639 | 5/1998 | Flockhart et al. | 379/221 |
| 5,878,126 | * 3/1999 | Velamuri et al. | 379/219 |
| 5,982,868 | * 11/1999 | Shaffer et al. | 379/220 |
| 5,991,395 | * 6/1998 | Miloslavsky | 379/265 |
| 6,115,462 | * 9/2000 | Servi et al. | 379/221 |
| 6,134,315 | * 10/2000 | Galvin | 379/219 |

* cited by examiner

Primary Examiner—Ahmad Matar
Assistant Examiner—Thjuan P Knowlin
(74) Attorney, Agent, or Firm—Oliff & Berridge, PLC

(57) ABSTRACT

An apparatus and method for routing calls to communication processing centers based on an optimal destination plan. Calls are allocated on the basis of area codes, regions, or other predetermined categories to particular communication processing centers. Each communication processing center's free capacity is calculated for all time intervals and this result is used to ascertain the smallest free capacity of any time interval for each communication processing center. The calls are then reallocated through linear programming methods such that the amount of smallest free capacity is maximized in order to determine the optimal call allocation scheme.

11 Claims, 10 Drawing Sheets

| PREDETERMINED CATEGORY A, SEGMENT 1 |||
|---|---|---|
| TIME | AVG. VOLUME | PEAK VOLUME |
| 7:00-7:15 am | 1,500 | 2,400 |
| 7:15-7:30 am | 1,700 | 2,950 |
| ⋮ | ⋮ | ⋮ |
| 6:45-7:00 pm | 1,050 | 1,300 |

(PREDETERMINED CATEGORY A, SEGMENT 2; PREDETERMINED CATEGORY A, SEGMENT 3; PREDETERMINED CATEGORY B, SEGMENT 1; PREDETERMINED CATEGORY B, SEGMENT 2)

| NPA SET/PERIOD | OFFERED VOLUME IN TIME PERIOD | | | | | |
|---|---|---|---|---|---|---|
| | 1 | 2 | 3 | 4 | 5 | 6 |
| 1 | 10 | 12 | 11 | 12 | 13 | 10 |
| 2 | 12 | 11 | 12 | 13 | 10 | 9 |
| 3 | 11 | 12 | 13 | 10 | 9 | 8 |
| 4 | 12 | 13 | 10 | 9 | 8 | 10 |
| 5 | 13 | 10 | 9 | 8 | 10 | 12 |
| 6 | 10 | 9 | 8 | 10 | 12 | 11 |
| 7 | 9 | 8 | 10 | 12 | 11 | 12 |
| 8 | 8 | 10 | 12 | 11 | 12 | 13 |
| PERIOD LOAD | 85 | 85 | 85 | 85 | 85 | 85 |

| VENDOR | 950 | 951 | 952 |
|---|---|---|---|
| CAPACITY (ERL) PER INTERVAL | 50 | 40 | 30 |

FIG. 10

| VENDOR/NPA | ASSIGNMENT OF WHOLE NPAs TO VENDORS | | | ASSIGNMENT OF SPLIT NPAs TO VENDORS | | |
|---|---|---|---|---|---|---|
| | 950 | 951 | 952 | 950 | 951 | 952 |
| 1 | 1 | 0 | 0 | 0.45 | 0.55 | 0.00 |
| 2 | 0 | 0 | 1 | 0.00 | 0.58 | 0.42 |
| 3 | 0 | 1 | 0 | 0.74 | 0.03 | 0.24 |
| 4 | 0 | 0 | 1 | 0.47 | 0.26 | 0.27 |
| 5 | 1 | 0 | 0 | 0.32 | 0.56 | 0.12 |
| 6 | 0 | 1 | 0 | 0.45 | 0.00 | 0.55 |
| 7 | 0 | 1 | 0 | 0.87 | 0.13 | 0.00 |
| 8 | 1 | 0 | 0 | 0.08 | 0.50 | 0.41 |

FIG. 11

| VENDOR/PERIOD | FREE CAPACITY FRACTIONS WITH WHOLE NPA ASSIGNMENTS TO VENDORS | | | FREE CAPACITY FRACTIONS WITH SPLIT NPA ASSIGNMENTS TO VENDORS | | |
|---|---|---|---|---|---|---|
| | 950 | 951 | 952 | 950 | 951 | 952 |
| 1 | 0.38 | 0.25 | 0.20 | 0.29 | 0.29 | 0.29 |
| 2 | 0.36 | 0.28 | 0.20 | 0.29 | 0.29 | 0.29 |
| 3 | 0.36 | 0.23 | 0.27 | 0.29 | 0.29 | 0.29 |
| 4 | 0.38 | 0.20 | 0.27 | 0.29 | 0.29 | 0.29 |
| 5 | 0.30 | 0.20 | 0.40 | 0.29 | 0.29 | 0.29 |
| 6 | 0.30 | 0.23 | 0.37 | 0.29 | 0.29 | 0.29 |

FIG. 12

| NPA SET/PERIOD | OFFERED VOLUME IN TIME PERIOD | | | | | |
|---|---|---|---|---|---|---|
| | 1 | 2 | 3 | 4 | 5 | 6 |
| 1 | 4 | 5 | 6 | 6 | 5 | 4 |
| 2 | 5 | 6 | 6 | 4 | 4 | 4 |
| 3 | 6 | 7 | 9 | 10 | 10 | 9 |
| 4 | 5 | 6 | 7 | 9 | 10 | 9 |
| 5 | 4 | 5 | 6 | 7 | 9 | 10 |
| 6 | 1 | 2 | 3 | 4 | 3 | 2 |
| 7 | 1 | 2 | 3 | 4 | 3 | 2 |
| 8 | 3 | 4 | 6 | 6 | 4 | 5 |
| PERIOD LOAD | 29 | 37 | 46 | 50 | 48 | 45 |

| VENDOR | 950 | 951 | 952 |
|---|---|---|---|
| CAPACITY (ERL) PER INTERVAL | 12 | 24 | 36 |

FIG. 13

| VENDOR/NPA | ASSIGNMENT OF WHOLE NPAs TO VENDORS | | | ASSIGNMENT OF SPLIT NPAs TO VENDORS | | |
|---|---|---|---|---|---|---|
| | 950 | 951 | 952 | 950 | 951 | 952 |
| 1 | 0 | 0 | 1 | 0.00 | 0.27 | 0.73 |
| 2 | 1 | 0 | 0 | 0.00 | 0.00 | 1.00 |
| 3 | 0 | 0 | 1 | 0.00 | 0.00 | 1.00 |
| 4 | 0 | 0 | 1 | 0.00 | 0.27 | 0.73 |
| 5 | 0 | 1 | 0 | 0.25 | 0.75 | 0.00 |
| 6 | 1 | 0 | 0 | 0.64 | 0.36 | 0.00 |
| 7 | 0 | 1 | 0 | 1.00 | 0.00 | 0.00 |
| 8 | 0 | 1 | 0 | 0.00 | 1.00 | 0.00 |

| VENDOR/PERIOD | FREE CAPACITY FRACTIONS WITH WHOLE NPA ASSIGNMENTS TO VENDORS | | | FREE CAPACITY FRACTIONS WITH SPLIT NPA ASSIGNMENTS TO VENDORS | | |
|---|---|---|---|---|---|---|
| | 950 | 951 | 952 | 950 | 951 | 952 |
| 1 | 0.50 | 0.67 | 0.58 | 0.78 | 0.64 | 0.51 |
| 2 | 0.33 | 0.54 | 0.50 | 0.62 | 0.53 | 0.41 |
| 3 | 0.25 | 0.38 | 0.39 | 0.46 | 0.37 | 0.32 |
| 4 | 0.33 | 0.29 | 0.31 | 0.31 | 0.31 | 0.31 |
| 5 | 0.42 | 0.33 | 0.31 | 0.40 | 0.34 | 0.31 |
| 6 | 0.50 | 0.29 | 0.39 | 0.52 | 0.31 | 0.37 |

METHOD AND APPARATUS FOR ASSIGNING INCOMING COMMUNICATIONS TO COMMUNICATIONS PROCESSING CENTERS

BACKGROUND OF THE INVENTION

1. Field of Invention

This invention relates to methods and apparatus for routing communications to communication processing centers (CPCs).

2. Description of Related Art

Many businesses use call centers coupled to networks such as telephone networks to provide services and information to customers and users. Directory assistance is an example of such a service which uses call centers. If available agents of a call center cannot answer an incoming call, the call is routed to a holding queue, to wait for an agent to become available. The time that a call is left in the holding queue is termed time-to-answer. On average, the longer the time-to-answer, the more likely it is that the calling party will simply hang up and abandon the call without waiting for the call to be answered. As a result, fees or sales may be lost. Thus, there is a need for new technology to reduce time-to-answer at call centers.

SUMMARY OF THE INVENTION

The present invention provides an apparatus and method for routing incoming voice and/or data communications to communication processing centers based on a destination plan. Incoming telephone communications are routed to communication processing centers based on various parameters such as numbering plan areas (NPA; i.e., area code), regions of origin/destination, or other parameters such as subject matter of the communications, skill level of receiving personnel, etc. The capacity of each communication processing center is determined and each communication processing center's free capacity is calculated for designated time intervals. From this result, the smallest free capacity of any time interval for each communication processing center is determined and the incoming communications are reallocated in a destination plan that maximizes the amount of smallest free capacity. Such maximization may be achieved through use of linear programming to make an initial distribution plan and also to make incremental incoming communication allocation adjustments.

The volume of incoming communications for telephone based services often has a regular daily pattern with one or more predictable high volume peak times. Reallocating incoming communications so that the amount of smallest free capacity is maximized spreads out the distribution of communications more evenly over the communication processing centers, thus reducing the average time to answer calls, while taking advantage of the noncoincidence of daily incoming communication volume peaks due to seasonal and regional variations and time zone differences.

BRIEF DESCRIPTION OF THE DRAWINGS

The invention will be described with reference to the following figures in which like reference numerals refer to like elements, and wherein:

FIG. 10 is an exemplary destination plan based on the data of FIG. 9;

FIG. 11 is the free capacity fractions of an exemplary destination plan based on the data of FIG. 9;

FIG. 12 is another exemplary input data set for use in developing an optimized destination plan;

FIG. 13 is an exemplary destination plan based on the data of FIG. 12;

DETAILED DESCRIPTION OF PREFERRED EMBODIMENTS

Figure 1:
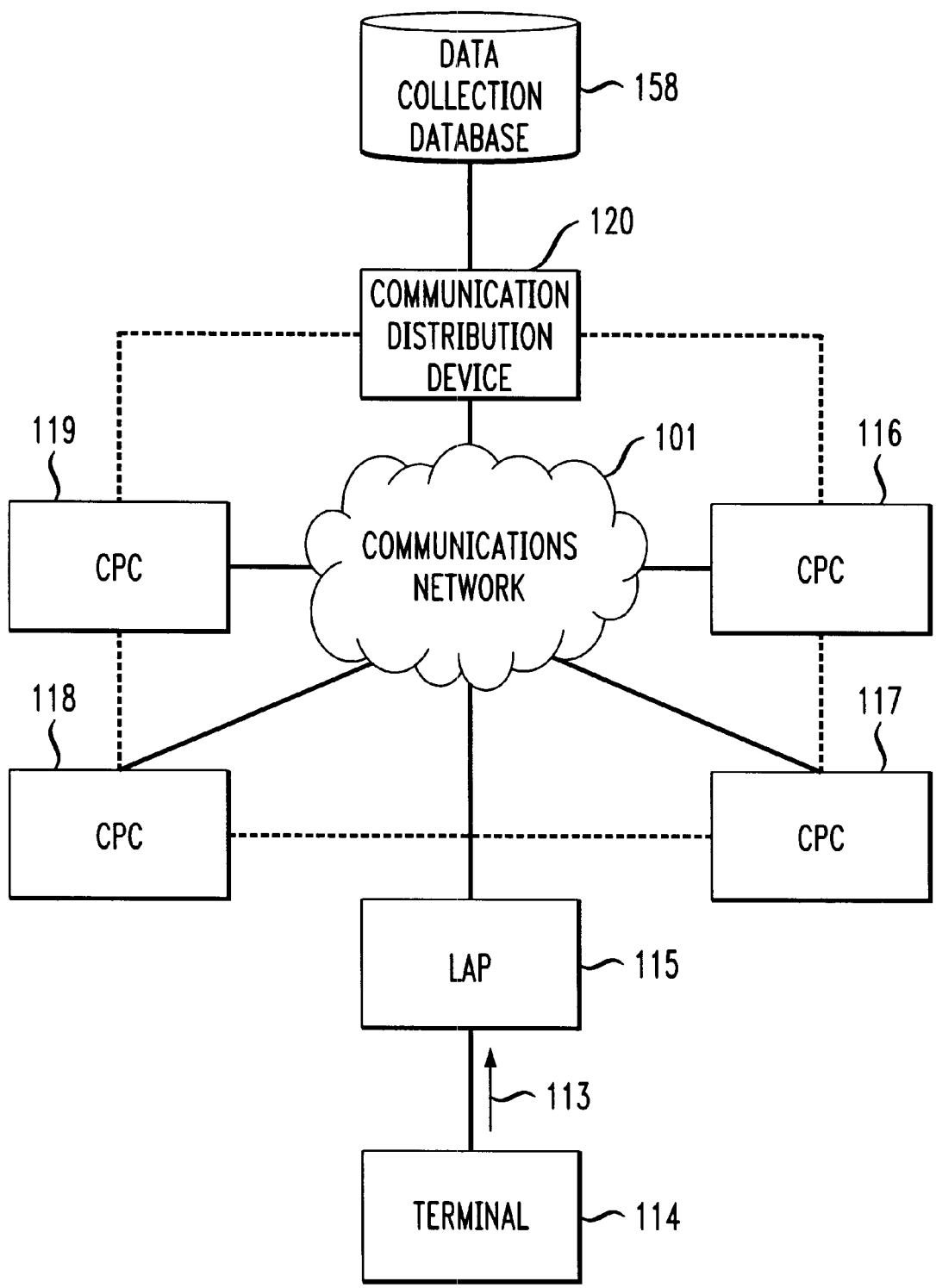
FIG. 1 is an exemplary block diagram of a communications processing system.

FIG. 1 is an exemplary block diagram of a communications processing system (CPC) 100. The communications processing system 100 includes a communications network 101, a terminal 114, a local access provider (LAP) 115, communication processing centers 116–119, a communications distribution device 120, and a data collection database 158.

FIG. 1 represents an incoming communication as an incoming signal 113. The incoming signal 113 may be any communication through the communications processing system 100 from the terminal 114. The incoming signal 113 may be voice and/or data communications from users, customers, vendors or other parties.

The communications processing system 100 conveys voice and/or data communications to and from users, customers, vendors or other parties. The communications network 101 may include a public switched telephone network (PSTN), the Internet, one or more cellular or wireless networks, or the like. The communications network 101 may also be a combination of two or more of these types of networks.

The terminal 114 represents a device through which a party (e.g., users, customers, vendors etc.) may communicate via the communications network 101. The terminal 114 may be a land line telephone, a cellular telephone, pager or other wireless communication device, a computer or other processing device, or any combination of such devices or the like.

The terminal 114 is shown as being connected to the communications network 101 through the LAP 115. The LAP 115 may be a local telephone exchange, a private branch exchange (PBX), a cellular or other wireless provider, a local area network (LAN) or wide area network (WAN), any other voice or data gateway, or the like. Depending on the configuration and access requirements of communications network 101, the terminal 114 may be directly connected to communications network 101 without need of a LAP 115 for access such as ISDN connection, for example.

For illustrative purposes, FIG. 1 shows only one terminal 114 connected to one LAP 115, four communication processing centers 116–119 and the communications distribution device 120. In practice of course, there may be many such terminal devices 114 and LAPs 115 interconnected throughout the communications processing system 100, as well as any number of communication processing centers 116–119 and/or any number of communications distribution devices 120.

FIG. 1 shows four communication processing centers 116–119 and one communications distribution device 120, interconnected via the communications network 101. The communication processing centers 116–119 may be call centers, agent services teams, automated call distributors (ACD), operator services positioning systems (OSPS), or the like. The communication processing centers 116–119 receive incoming voice and/or data communications via the PSTN, the Internet, one or more cellular or wireless networks, or the like.

For illustrative purposes, incoming communications are discussed herein as first received by the communications distribution device 120, and then distributed from the communications distribution device 120 to one of the communication processing centers 116–119. The communication processing centers 116–119 are staffed with one or more service agents to respond to incoming communications and provide service to the calling party or party who generated the incoming communication. Service agents include operators, telemarketing representatives, customer service representatives, dialog systems or the like, depending on the remote service being provided and the norms of that particular industry.

While FIG. 1 shows a centralized communications distribution device 120, the communications distribution device 120 may be distributed throughout the communications network 101. The functions performed by the communications distribution device 120 may be performed by processors such as servers, routers or other adjunct equipment or apparatus within the communications network 101 or by some or all of the communication processing centers 116–119. Thus, in a distributed implementation, the incoming signal 113 from the terminal 114 may be first received by any of the devices performing the functions of the communications distribution device 120 and then routed, if necessary, to other devices based on the method and apparatus described herein.

For example, if the functions of the communications distribution device 120 are performed by each of the communication processing centers 116–119, the communication processing centers 116–119 may be arranged in various configurations to allow incoming communications to be distributed among the communication processing centers 116–119. For instance, the communication processing centers 116–119 may be organized in a circuitous round-robin fashion so that the incoming signal 113 may be circulated until handled. If a point-to-point star-like organization is used, each of the communication processing centers 116–119 may distribute the incoming signal 113 to any of the other communication processing centers 116–119. Selected ones of the communication processing centers 116–119 may function as a local communications distribution device 120 with other neighboring communication processing centers associated with it in a hub-and-spoke fashion. In yet another embodiment, any or all of communication processing centers 116–119 may be directly connected to each other independent of the communications network 101 by a dedicated coaxial line, fiber optic cable, twisted pair, radio link or like communication paths. The connection 121 shown as a dashed line illustrates such a direct connection implemented in a round-robin fashion connecting the communications distribution device 120 and the communication processing centers 116–119 together.

The present invention could be used in any line of business where there are incoming communications from parties such as users, customers, vendors, etc. via the communications network 101 to be handled by the communication processing centers 116–119. Long distance directory information, operator assistance, telemarketing sales and information, and customer assistance, are but a few examples of services that may be provided by the communication processing centers 116–119.

For ease of discussion, the following text refers to "calls" for assistance, information, etc., even though the "call" may be incoming communications via the many different types of devices represented by the terminal 114. Thus, a call may be a telephone call or a query over a data network, for example.

The term "routing" as used herein denotes the general concept of directing the incoming signal 113 to a specific one of communication processing centers 116–119. Thus, routing the incoming signal 113 specifies which of the communication processing centers 116–119 the incoming signal 113 is sent for processing.

The present invention is a method and apparatus for generating and implementing a destination plan for routing incoming communications to communication processing centers 116–119. The destination plan, which routes communications based on predetermined categories, specifies the allocation of incoming signals 113 to be routed to various ones of the communication processing centers 116–119. Incoming signals 113 are routed among the communication processing centers 116–119 according to the destination plan so as to maximize the free capacity of all communication processing centers 116–119. The destination plan is generated using linear programming or similar methods.

In order to implement the destination plan for routing incoming communications, there must be an incoming communication routing mechanism capable of splitting the incoming communication traffic among multiple communication processing centers. For instance, incoming communications could be routed by one or more of the communication processing centers, by the Alternative Routing System, by the Least Cost Routing (LCR) System, or by a like routing mechanism.

The predetermined categories may be desired traits of the terminal 114 or skill parameters associated with the incoming signals 113 itself. Examples of such predetermined categories include an area code, a dial string, a country parameter, a region, a city, state or county, a zip code, an address, an income or demographic, a time of the day of the communication, a language, a dialect or accent, or the like. These predetermined categories may be associated with either the terminal 114 originating the communication, or with the destination of the incoming signal 113. The predetermined categories may be grouped to correlate with actual skills or expertise which enable service agents to increase their efficiency in providing remote services.

Predetermined categories could be any information which identifies or which pertains to the incoming signal 113 or the terminal 114. For instance, the incoming signal 113 which originates from the terminal 114 in an area with a particular dialect could be routed based on a predetermined category for dialect and accent to a service agent who converses in the same dialect. Or for example, the destination area code may be used as the predetermined category. Then long distance telephone directory assistance calls may be routed based on the area code. Incoming calls placed to telephone numbers of the form (NPA) 765–4321 may be routed to the one of the communication processing centers 116–119 which normally serves that "NPA" area code. This allows directory assistance operators to become familiar with the towns, cities and various area codes of a region and thus provide efficient, helpful service.

Predetermined categories may be applied to level the workload among various communication processing centers 116–119. For example, the time zone from which an incoming signal 113 originates may be used as the predetermined category for routing the incoming signal 113 to a one of the communication processing centers 116–119. In the case of multiple communication processing centers 116–119 located in different time zones, incoming calls may be split among the multiple communication processing centers 116–119 based on the time zone predetermined category. Using the time zone as a predetermined category tends to level out the distribution of incoming calls, since the peak incoming call volumes of each time zone occur at different times. In this way, noncoincidence of call volume peaks in different time zone regions may be exploited.

Other information pertaining to the incoming caller such as the zip code, address, income or other demographics may be used as predetermined categories for routing incoming calls. This information may be kept in a predetermined category database to be referenced for routing purposes upon receipt of an incoming call. In such a database, this information may be associated with each incoming caller anticipated to be encountered. When an incoming call is received, the information in the database may be matched to the incoming caller by referencing call identification information of the incoming signal 113. The database may index each incoming caller's call identification with the predetermined category information kept for that caller.

A predetermined category database may be compiled by requesting subscribers or customers to fill out application forms or questionnaires. Information about the nature of services likely to be sought by a subscriber or customer may be compiled by recording a history of calls from the customer and the nature of the services sought during those calls. Such demographic information (e.g., household income) can be associated with individual terminals 114 or geographic regions using zip codes, for example. For an income associated with a geographic region, a call from an affluent McLean, Va. suburb may be assumed to be from a wealthy household while a call from the coal mining town of Wise, Va. may be assumed to be from a lower middle-class household, for example. Information for the predetermined category database may also be purchased from firms which gather and sell such information, may be extracted from census data, or may be constructed from call traffic data, for example.

Figure 2:
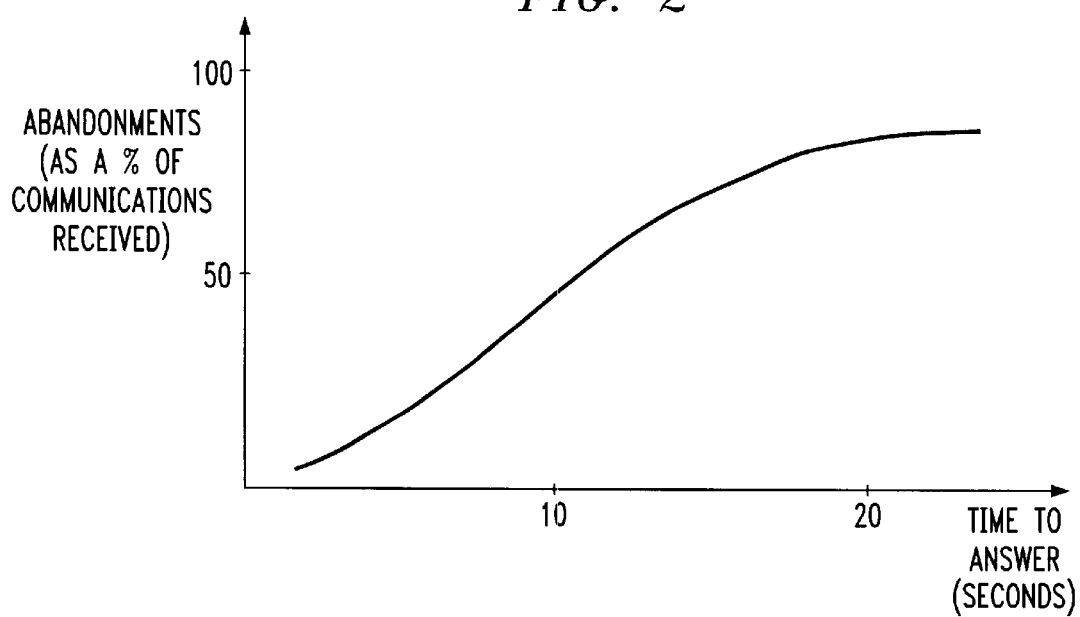
FIG. 2 is an exemplary graph of the relationship between time-to-answer and the percentage of incoming communication abandonments.

FIG. 2 shows an exemplary graph of the relationship between time-to-answer and the percentage of call abandonments. The probability that a caller will abandon a call significantly increases if the time-to-answer is more than a few seconds, resulting in calls going abandoned. As the time-to-answer grows longer due to, for example, an overload in one of the communication processing centers 116–119, the number of abandoned calls correspondingly increases.

The relationship between time-to-answer and abandoned calls is subject to a number of variables. For example, the time-to-answer before a call is abandoned may depend on the time of day that the call is placed. A call during busy daylight hours may be abandoned after only a few seconds of waiting time, while it may be much longer before an abandonment occurs for a call during the evening or nighttime. The willingness of a caller to wait for an available service agent is sometimes called waiting time tolerance. The waiting time tolerance or time-to-answer before abandonment also depends on whether there is a call-waiting or call wait queuing feature which plays or displays music, news or other information. In general, a destination plan with a higher time-to-answer can be tolerated in situations where users, customers, vendors or other parties have a high waiting time tolerance.

The relationship between the time-to-answer and the number of calls abandoned also varies depending on the importance of the call. Calls which are important to the caller normally will have a longer time-to-answer before being abandoned than calls of marginal importance. For instance, an incoming call to a computer assistance information number would most likely have a higher waiting time tolerance than an incoming call to a time-and-temperature information number. In the destination plan the above relationship between time-to-answer and the probability of call abandonment is taken into account.

Figure 3:
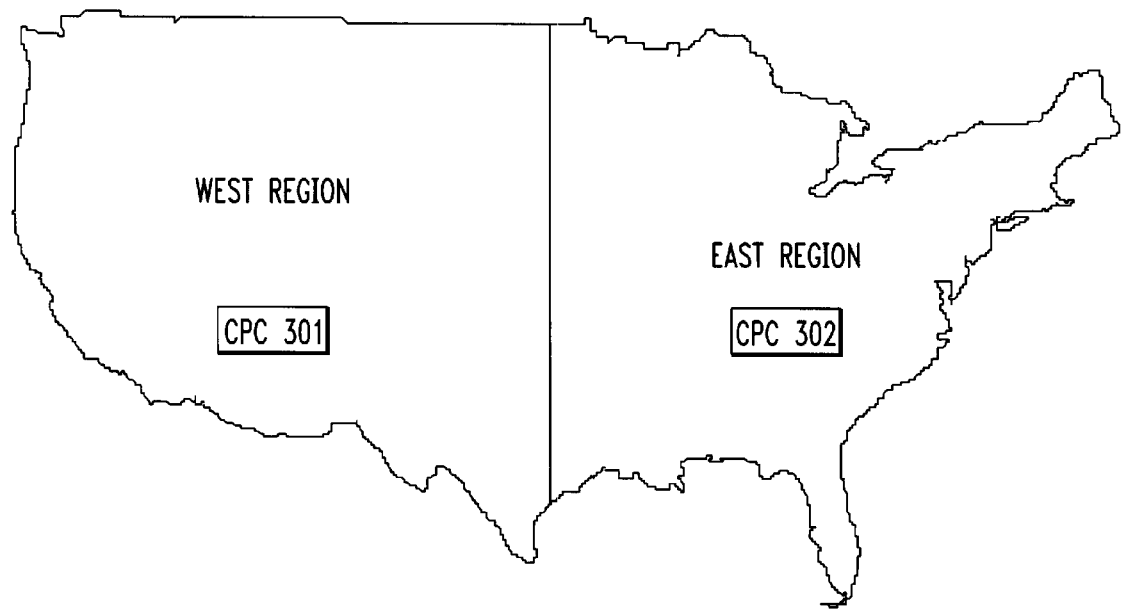
FIG. 3 is an exemplary map of a geography-based destination plan of two communication processing center regions.
Figure 4:
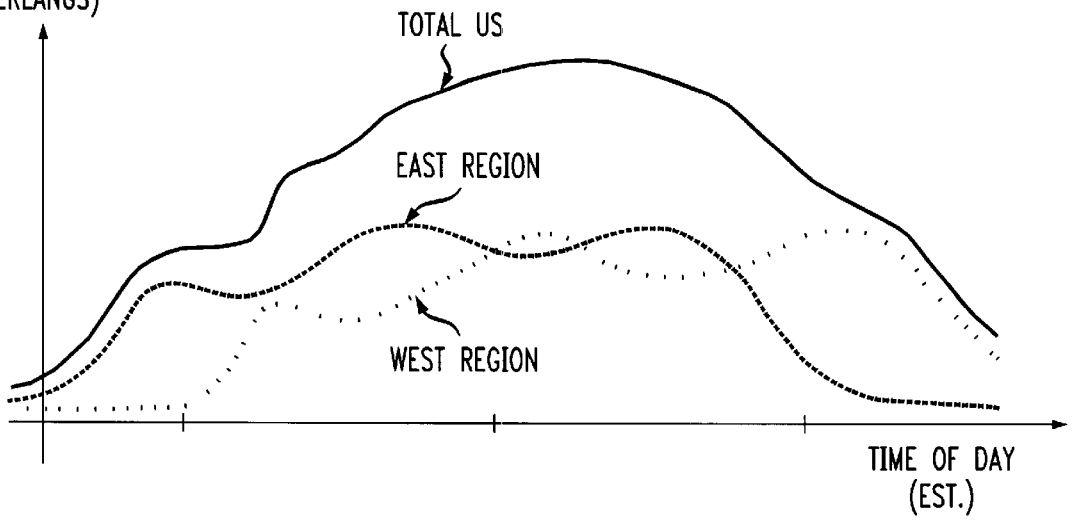
FIG. 4 is an exemplary graph of daily incoming communication volume patterns.

FIG. 3 is an exemplary map of a geography-based destination plan for the United States to illustrate a non-coincidence of call volume peaks shown in FIG. 4. In this example, the geography-based destination plan divides the United States into two predetermined category regions, a West Region and an East Region served by communication processing center (CPC) 301 and CPC 302, respectively. Calls that originate in the West Region are first received by CPC 301 while calls originating in the East Region are first received by CPC 302.

FIG. 4 is an exemplary graph of daily call volume patterns for the CPCs 301 and 302, along with the total overall daily call volume pattern. Because the regions of FIG. 3 span different time zones, the daily call volume pattern of the West Region is shifted later in time from that of the East Region. Thus, the daily call volume peaks for the two regions occur at different times. The non-coincidence of call volume peaks provides potential efficiencies which can be realized by sharing communication processing center resources across different time zones. By exploiting the noncoincidence of call volume peaks in different regions, CPCs 301 and 302 can be operated more efficiently in the sense of requiring fewer agents for a given maximum time-to-answer for the peak time of the day. For example, at 12:00 pm EST, the East Region is experiencing a peak of noontime incoming calls while the West Region is operating at a lower level since it is mid-morning in the West Region. Therefore, some of the West Region calls could be rerouted to CPC 302 in the East Region to more evenly distribute the incoming calls between CPC 301 and CPC 302.

Figure 5:
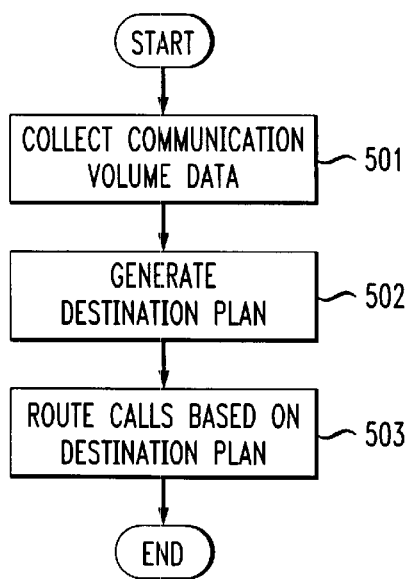
FIG. 5 is a general flowchart for routing calls to the communication processing centers.

FIG. 5 is a general flowchart for operating the communications processing system 100. In step 501, historical call volume data is collected and stored. Such data collection normally takes place at the communications distribution device 120, but may also be performed in a distributed fashion among all or some of communication processing centers 116–119. In step 502, the destination plan is generated which specifies the fraction of the incoming signal 113 to be routed to various ones of the communication processing centers 116–119, based on the predetermined categories of the incoming signal 113. In short, when the incoming signal 113 is received at the communications distribution device 120, it is routed to the appropriate one of communication processing centers 116–119 according to the destination plan. In step 503, the incoming signals 113 are routed to the communication processing centers 116–119 according to the destination plan.

Figures 6, 7:
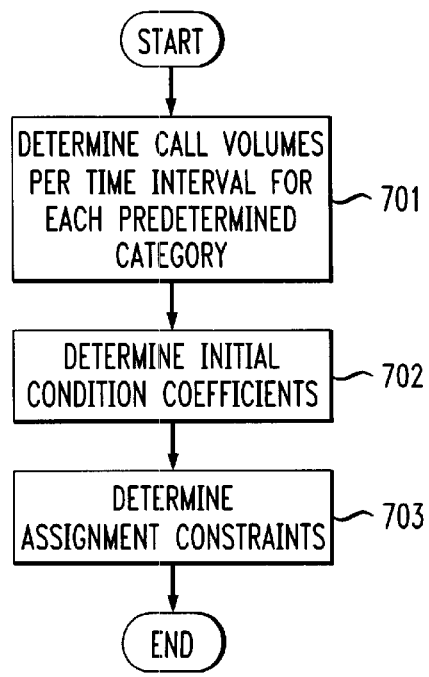
FIG. 6 is an exemplary diagram of historical incoming communication volume data to be collected and stored.
FIG. 7 is the process of determining input coefficients and constraints used in generating a destination plan.

FIG. 6 is an exemplary diagram of historical call volume data which is collected, categorized and saved based on one or more predetermined categories of interest. For instance, if the only predetermined category of interest is the geographic region of FIG. 3 from which a call is initiated, then Predetermined Category A Segment 1 of FIG. 6 would be the West Region and Predetermined Category A Segment 2 would be the East Region, for example. If multiple predetermined categories are of interest, then the call volume data may be categorized under Predetermined Category B, Predetermined Category C and so on, collected and sorted accordingly. For instance, call volume data may be sorted by region, and also sorted for each region by another predetermined category such as household income. There could then be multiple sets of the data tabulations shown in FIG. 6, with each set corresponding to a particular region. Then, within each set, the segments would correspond to various income ranges; e.g., Predetermined Category A Segment 1 could be $10 k–$20 k/yr, Predetermined Category A Segment 2 could be $20 k–$30 k/yr, and so on.

The historical call volume data is one of the inputs, known as coefficients, required to set up a linear programming model for determining the destination plan. In short, the linear programming model for determining the destination plan operates subject to a set of coefficients and constraints which describe the communications processing system 100. The linear programming model uses input parameters and/or coefficients, decision or assignment variables, and objective functions. The input parameters and/or coefficients may be unit costs that could be communication processing center dependent, call volumes that could be predetermined category and time of day dependent, and call handling capacities that could be communication processing center and time of day dependent. Decision or assignment variables, when set, define a portion of the destination plan. The objective function combines decision variables with unit costs and may be represented as a linear function of the decision variables. The linear programming model also uses a collection of constraints that combine the decision variables with some of the input data coefficients and may be represented as linear equalities or inequalities of the decision variables. The collection of constraints could include operational constraints (e.g., capacity) which assure that the destination plan does not overload a one of the communication processing centers 116–119. The collection of constraints could also include assignment constraints to assure that every category is properly assigned to one or more of the communication processing centers 116–119.

The linear programming model, when executed, determines the values of the decision variables that optimize the objective function while at the same time also satisfying the set of constraints. In one formulation, the objective function is designed to maximize the minimum of the free capacity, to be defined later, across time periods and across the communication processing centers 116–119. The set of capacity coefficients ensures that the communication processing centers 116–119 are loaded within their capability to handle the call volumes directed towards them.

Some of the decision variables may be preset because of existing conditions or mandatory conditions. When decision variables are preset, they act as assignment constraints. An example of preset decision variables occurs in the situation where a partial destination plan exists and is already in place, and should not be altered. In this situation, the linear programming model is used to solve for an optimal destination plan which accommodates the residual call volumes.

FIG. 7 is the process of determining the input coefficients and constraints used in generating the destination plan. In step 701, the historical call volume data, as exemplified in FIG. 6, is used to determine the daily pattern of incoming call volume for each predetermine category. The call volume data collected may include the average call volume and the peak call volume. Such data is collected for each time interval of interest. One exemplary set of time intervals is the set of all the fifteen minute intervals between 7:00 am and 7:00 pm. The average call volume and the peak call volume can be measured in calls per unit of time (e.g., hour), in Erlangs, or in any convenient units. An Erlang is a dimensionless rate unit which represents 3600 call-seconds per hour. This loosely translates to one operator-hour per hour.

The free capacity of one of the communication processing centers 116–119 in a given hour is defined to be the difference between its capacity to handle calls at a given quality of service (parameter B) and the call volume directed towards it (parameter A). Both of parameters A and B may be measured in units of Erlangs, or in calls per hour. In general, when the relationship: $B-A>0$ is true, the resulting quality of service will exceed the target for quality of service.

The linear programming model may also account for other types of coefficients such as initial condition coefficients, determined in step 702, and the assignment constraints, determined in step 703. Initial condition coefficients are those qualities of the communications processing system 100 that are not call-routing related and are fixed. For example, the capacity coefficient is the maximum number of calls that can be handled by one of the communication processing centers 116–119. Initial condition data may also include service agent staffing levels of the communication processing centers 116–119 and the service agents' shift length (e.g., 8 hour shifts), which yield level of staffing by time of day. Another type of initial condition coefficient may be performance objectives for the communication processing centers 116–119. For example, performance objectives such as the maximum allowable mean time-to-answer and maximum amount of abandoned calls may be initial condition coefficients as well.

Assignment constraints are those fixed qualities of the communication processing centers 116–119 that are call-routing related such as a requirement that incoming calls of a specific predetermined category must be routed to particular ones of the communication processing centers 116–119. The assignment constraints include restricted assignments, prohibited assignments, or required assignments. A restricted assignment constraint may prevent a certain predetermined category from being split among two or more of the communication processing centers 116–119, so that the whole predetermined category must be assigned to a single one of the communication processing centers 116–119. A prohibited assignment constraint may prohibit a particular one of the communication processing centers 116–119 from receiving incoming calls from a certain predetermined category. The assignment constraints may be consequences of a labor union agreement, a contract in force which applies to the service agents, or some other like reason. By contrast, a required assignment constraint may require a particular one of communication processing centers 116–119 to receive all incoming calls associated with a certain predetermined category.

Returning to FIG. 5, the destination plan is generated in step 502. The preferred embodiment generates the destination plan using linear programming techniques. The objective function and the constraints of the linear programming model discussed above are linear functions, equalities and inequalities of non-negative variables. Linear programming is a way of adjusting the values of certain variables of the linear functions so as to obtain an extreme value for the linear objective function. For example, variables in the linear objective function may represent the percentages of calls for the predetermined categories that are routed to the communication processing centers 116–119. The values of these variables are subject to the operational condition constraints and the assignment constraints.

In the preferred embodiment, the variable that the linear program maximizes is a boundary value that represents the smallest value of free capacity of all the communication processing centers 116–119, over all time intervals. Free capacity of a one of the communication processing centers 116–119 is the difference between the capacity of the one of the communication processing centers 116–119 and the actual number of calls at a particular time interval. Thus, if a one of the communication processing centers 116–119 can handle a maximum of one thousand calls every fifteen minutes, and from 10:00 am to 10:15 am six hundred calls are received, then the free capacity is four hundred calls per that fifteen minute interval.

The bounding value of a group of communication processing centers 116–119 is the smallest free capacity of any time interval for all of the communication processing centers 116–119. If the free capacities of all the communication processing centers 116–119 are: 500, 450, 350 and 700, respectively, then the bounding value is 350. If calls are routed differently, then the bounding value may be made larger. For example, if one hundred of the calls received by the communication processing center 118 were routed to communication processing center 119, then the free capacities of all the communication processing centers 116–119 would be 500, 450, 450 and 600, respectively. In this case, the bounding value would be 450. Thus, the smallest free capacity was raised from 350 to 450.

If calls are routed based on the results of the linear program, maximizing the boundary value improves service, and reduces abandonments. Maximizing the boundary value may also permit reductions of system costs by generating a destination plan for incoming communications that makes advantageous adjustments of the number of service agents hired for each of the communication processing centers 116–119.

The constraints of the communication processing centers 116–119 as discussed above may be subject to feasibility constraints. For example, in using area code as a predetermined category, if a particular area code (i.e., an NPA) is subject to a restriction constraint and cannot be split among more than one of the communication processing centers 116–119, then there must be at least one communication processing center 116–119 with sufficient capacity to handle the maximum call volume of that area code during each time interval. In other words, if a particular area code cannot be split among more than one of the communication processing centers 116–119, then it must be feasible for at least one of the communication processing centers 116–119 to handle all of the incoming calls for that area code.

The following describes an exemplary linear function that may be used to generate the destination plan. Let index i represent a particular predetermined category segment; index j denote one of the communication processing centers 116–119; parameter $B_j$ denote the capacity for communication processing center j; index t be a time interval (e.g., from 7:00 am to 7:15 am); and parameter A denotes the incoming communication volume where $A_{it}$ is the incoming communication volume of a predetermined category segment i for time interval t.

In the ensuing discussion, the communication processing centers 116–119 are referred to as communication processing center j. For example, if area code is used as the predetermined category, then i is a particular area code (i.e., NPA). If there are three area codes, then i=1 may correspond to area code 1, i=2 may corresponds to area code 2 and i=3 may correspond to area code 3, where I=3 is the total number of predetermined categories. If four communication processing centers 116–119 are under consideration, then j=1 may correspond to communication processing center 116, j=1 may correspond to communication processing center 117, and so on where J=4 is the total number of communication processing centers 116–119.

In terms of these definitions, the feasibility constraint mentioned above can be stated as: for each $NPA_i$, there must be at least one communication processing center j such that $B_j > A_{it}$ for all of time t, where $B_j$ is the capacity of communication processing center j and $A_{it}$ is the call volume of $NPA_i$ for time interval t. Another feasibility constraint may be that the total capacity of all communication processing centers must at all times exceed the total load of calls, i.e., sum of all $B_j$ must be greater than the sum of all $A_{it}$ for any time interval t.

Additionally, assignment constraints can be expressed by setting an assignment variable $x_{ij}$ to a fractional value where $0 \leq x_{ij} \leq 1$. The variable $x_{ij}$ indicates that the incoming signal 113 from the ith predetermined category segment is to be assigned for routing to the jth communication processing center. Thus, if $x_{ij}=0.5$, the jth communication processing center receives half of the incoming signals of predetermined category j. A required assignment is represented as $x_{ij}=1$ and a forbidden assignment is represented as $x_{ij}=0$.

In other words, the value of variable $x_{ij}$ is the percentage of call volume from the $NPA_i$ which is assigned to be routed to communication processing center j, over all time intervals. For ease of illustration, the assignment variables $x_{ij}$ are discussed in terms of a single assignment being made for all time intervals of the day. In practice, however, the assignments could be made to vary over the course of the day, in which case the assignment variable would become $x_{ijt}$, with t being the time interval of the assignment.

The process of generating a destination plan begins by setting the initial condition coefficients, as discussed above. In this step, coefficients are set for a maximum allowable mean time-to-answer and target maximum amount of abandoned communications, along with setting the performance objectives or other initial condition coefficients for the communication processing centers 116–119, such as communication processing center service agent staffing levels, shift length or the like. This is equivalent to setting an upper bound $B_j$ on the amount of traffic offered to each communication processing center j ($1 \leq j \leq J$) during each time interval t ($1 \leq t \leq T$), where j=1 is the first communication processing center and j=J is the last communication processing center and t=1 is the first time interval and t=T is the last time interval. For instance, in practice a particular communication processing center j with enough service agents and resources to handle 100 Erlangs of incoming communication volume would have its capacity set to $B_j$=105 operators in order to provide a given grade of service.

The linear program changes the $x_{ij}$ for all i and j to maximize the boundary value. For each set of $x_{ij}$ where $1 \leq i \leq I$ and $1 \leq j \leq J$ where I is the total number of predetermined categories and J is the total number of communication processing centers, the following equation (1) is always satisfied.

$$\sum_{j=1}^{J} x_{ij} = 1 \quad 1 \leq i \leq I. \tag{1}$$

Equation (1) simply says that every category i has to be fully assigned in whole to a single communication processing center j or fractionally assigned to several communication processing centers j (i.e., no dropped calls; all calls are assigned to some communication processing center j). Each set of values $x_{ij}$ for $1 \leq i \leq I$ and $1 \leq j \leq J$ is a possible destination plan when equation (1) is satisfied. The destination plan that maximizes the bounding value is selected as the destination plan output by the linear program.

The boundary value is maximized by comparing the smallest free capacity of each of the communication processing centers for each possible destination plan and selecting the possible destination plan that results in the largest value for the smallest free capacity. The free capacity $y_{jt}$ measured as a fraction of each communication processing center j for each time interval t ($1 \leq t \leq T$) is defined by:

$$1 - \sum_{t=1}^{t} [(A_{it} x_{ij})/B_j] = y_{jt} \quad 1 \leq j \leq J, 1 \leq t \leq T. \tag{2}$$

where $B_j$ is the capacity of communication processing center j and $A_{ij}$ is the call volume of the ith predetermined category during the time interval t.

The boundary value z is expressed in terms of the free capacity as:

$$y_{jt} \geq z \quad 1 \leq j \leq J, 1 \leq t \leq T. \tag{3}$$

The linear program determines the values of $x_{ij}$ for all i and j that maximize z.

Maximizing z, tends to equalize the utilization of communication processing centers j and results in the destination plan because each $x_{ij}$ indicates the percentage of calls of a particular prediction category that should be routed to a specific communication processing centers $_j$.

In addition, in equation (2), the parameter $B_j$ (capacity of communication processing center j) may also be varied. Thus, while in the above example, $B_j$ may is assumed to be an initial condition coefficient, the $B_j$ may be treated as a changeable value so that the linear program may generate several destination plans that correspond to different scenarios. Any combination of variables and constraints may be selected to generate an optimal destination plan and staffing plan based on business objectives such as achieving minimum operating costs, etc.

The method used in generating a destination plan can be altered in a number of ways, depending upon the circumstances and goals to be met. For example, the calculations used in maximizing free capacity can be adjusted so as to maximize the sum of the minimum free capacity percentages for each communication processing center regardless of the relative size of the communication processing centers 116–119, rather than maximizing the minimum of free capacity measured as a fraction across all communication processing centers 116–119. Another variation is achieved by factoring the labor rates or costs of each communication processing center into the routine for maximizing the smallest free capacity. This results in an optimal destination in which communication processing centers 116–119 in lower cost or less expensive labor markets tend to be given predetermined category assignments with more free capacity than higher labor rate communication processing centers. In effect, factoring the labor rates or costs maximizes the dollar value of smallest free capacity.

Figures 8, 9:
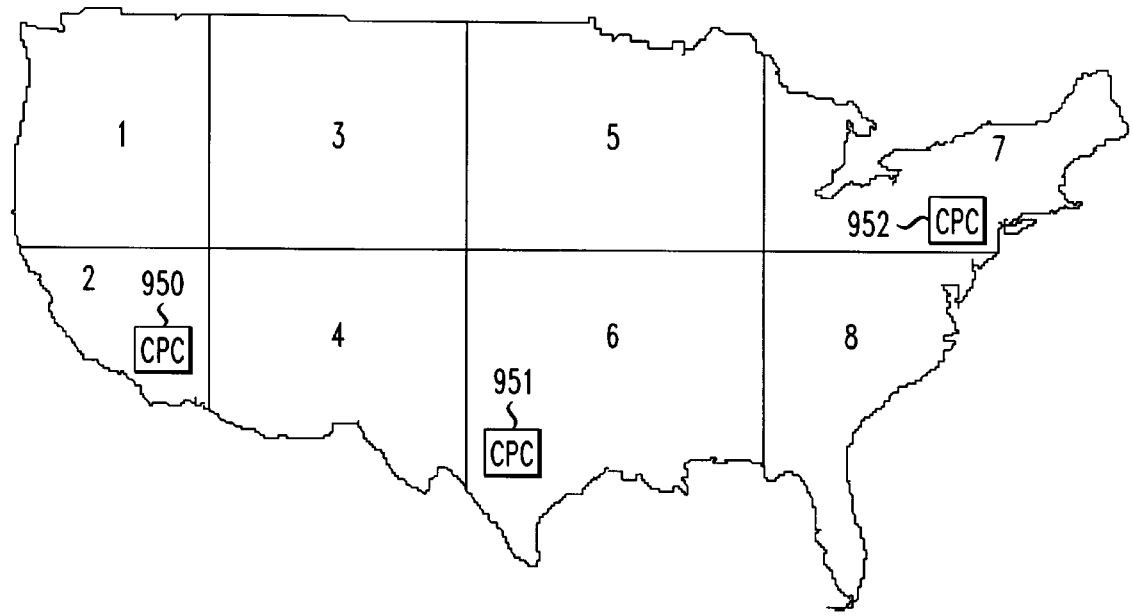
FIG. 8 is an exemplary geographical division of communication coverage area.
FIG. 9 is exemplary input data for use in developing an optimized destination plan.

The following describes detailed examples illustrating the operation of the linear program described above. FIG. 8 is an exemplary communication coverage area geographically divided into area codes as the predetermined category for routing calls. The overall communication coverage area of FIG. 8 is divided into eight regions based on fictitious area codes NPA 1 through NPA 8. Each of regions NPA 1 through NPA 8 is served by one or more of the three communication processing centers 950–952.

FIGS. 10–12 show an exemplary embodiment of the linear program used in determining an optimal destination plan. The example disclosed in FIGS. 10–12 is based on three communication processing centers 950–952 covering eight regions NPA 1 through NPA 8, as shown in FIG. 8, over a period of six time intervals. The predetermined categories in this example are based on NPAs, but could correspond instead to any desired predetermined category (e.g., dial string, income, language, dialect, etc.) as discussed above. The examples described in conjunction with FIGS. 10–15 are for illustration only. In actual practice, cal time intervals, communication processing centers, service agent teams or predetermined categories. For example, 15 minute time intervals may be used to divide up a relevant busy period of the network (e.g., 7:00 am to 9:00 pm), or even to divide up all twenty-four hours of the day. This would result in fifty-six daily time intervals, rather than the present simplified examples which use only six time intervals.

FIG. 9 is exemplary input data for use in developing an optimized destination plan, in which the total call volume in each time interval is equal to 85 Erlangs. The communication processing centers 950, 951 and 952 and predetermined categories NPA 1 through NPA 8 are as shown in FIG. 8. These three communication processing centers 950, 951 and 952 of FIG. 9 have capacities of 50, 40 and 30 Erlangs, respectively, as shown. The daily call volume generated within each NPA is read across from time interval 1 to time interval 6 for each NPA. The call data is simplified in this example in order to ease explanation of the model. Note that in this example the daily call volume pattern for each NPA is a shifted cyclic permutation of the first NPA communication volume pattern. For instance, the call volumes for intervals 4, 5 and 6 of NPA 1 are 12, 13 and 10 Erlangs respectively. Similarly, shifting back one time interval to intervals 3, 4 and 5 of NPA 2, the call volumes and 4 of NPA 3. Thus, because the loads are shifted by one time interval, no two NPAs have the same call volume during any given time interval, yet the overall call volumes are equal to 85 Erlangs for each time interval.

FIG. 10 is an exemplary destination plan based on the data of FIG. 9. This figure shows two different modes of NPA assignments for each NPA, the whole NPA assignment mode on the left side and the fractional NPA assignment mode on the right side. For the whole NPA assignment mode, assignments are made as a binary function. Each of the three communication processing centers is assigned either all or none of the calls of a particular NPA for all time intervals. For example, communication processing center 950 has all calls for NPAs 1, 5 and 8 assigned to it. In an alternative embodiment, communication processing centers can similarly be assigned on a binary basis, but the assignment may vary from one time interval to the next. Referring back to FIG. 9 and adding the communication volumes of all six time intervals for NPAs 1, 5 and 8 gives communication processing center 950 an call volume of 68, 62, and 66 Erlangs, respectively, for time intervals 1–6 of NPAs 1, 5 and 8. Hence, communication processing center 950 has a daily total communication volume of 196 Erlangs (68+62+ 66) and a total daily capacity of 300 (6×50).

FIG. 11 shows the free capacity fractions of an exemplary destination plan based on the data of FIG. 9. The free capacity fractions are shown per time interval for each communication processing center in a whole NPA assignment mode and a fractional NPA assignment mode. For example, in time interval 1 communication processing center 950 is shown to have a free capacity of 0.38 (38%). This is calculated by dividing the time interval 1 call volume for NPAs 1, 5 and 8 assigned to communication processing center 950 (10+13+8) by communication processing center 950's capacity of 50 and subtracting this amount ($^{31}/_{50}$=0.62) from 1 to give 0.38. For communication processing center 950 with NPAs 1, 5 and 8 assigned to it, the smallest free capacity comes in time intervals 5 and 6 at 30%.

The right side of FIGS. 10 and 11 illustrate the fractional NPA assignment mode. In this situation the assignment constraints are relaxed such that calls for any given NPA can be split among the communication processing centers. For example, 45% of the calls for NPA 1 go to communication processing center 950 with communication processing center 951 receiving the other 55%. FIG. 11 shows the smallest free capacity fraction for each communication processing center to be 29%. In fact, because of the simplified symmetrical data of FIG. 9, each communication processing center has 29% free capacity for all time intervals.

Figures 14, 15:
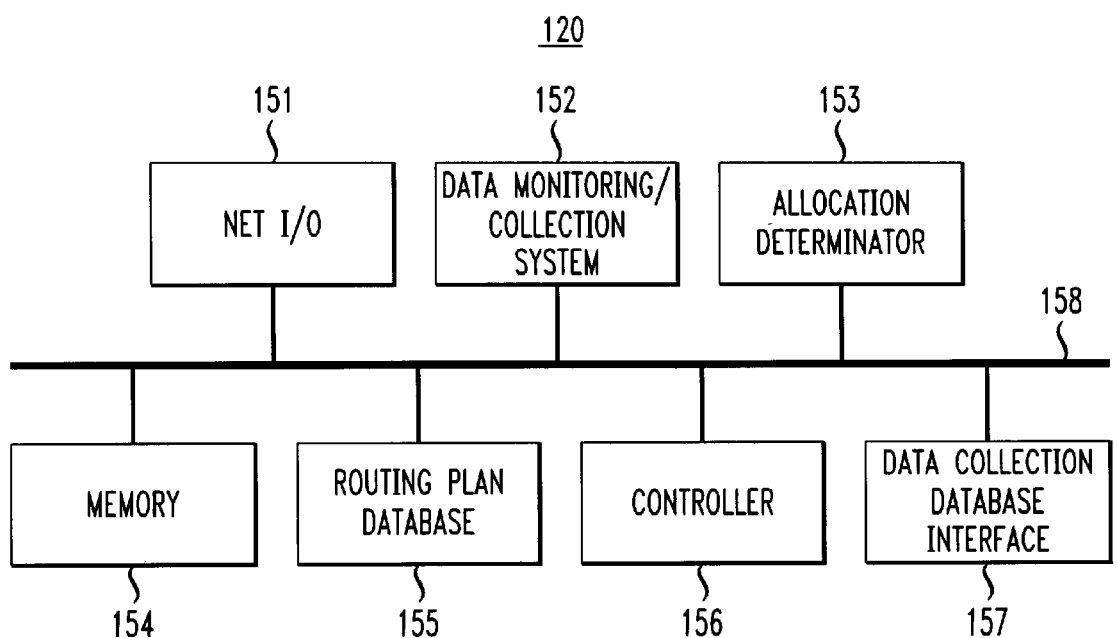
FIG. 14 is the free capacity fractions of an exemplary destination plan based on the data of FIG. 12.
FIG. 15 is an exemplary block diagram of a communication processing center.

FIGS. 12–14 illustrate another example of the modeled linear programming results to develop a destination plan in which service agent team resources are optimized for a given set of input data. As in the previous example of FIGS. 12–14, there are three communication processing centers 950–952 covering eight NPAs over six time intervals. The example of FIGS. 12–14 is set up so that the total capacity for all three vendors is only slightly greater than the peak call volume for the busiest time interval of the day. This example also differs from the example of FIGS. 9–11 in that the input data is less uniform. FIGS. 12–14 have a much greater percentage difference in both the service agent team capacities as well as call volumes, as compared to FIGS. 9–11. One result of this example with less overall free capacity and less uniform data, is that there are greater percentage gains to be made in splitting the assignment of NPAs between communication processing centers than in using the whole NPA assignment mode, as compared to the previous example. For the whole NPA assignment mode there is a maximum smallest free capacity of 25%, as compared to the fractional NPA assignment mode which results in an 31% maximum smallest free capacity—an increase of 6% of free capacity.

FIG. 15 is an exemplary block diagram of the communications distribution device 120. As shown in FIG. 15, the communications distribution device 120 includes a network I/O 151, a data monitoring/collection system 152, an allocation determinator 153, a memory 154, a routing plan database 155, a controller 156, and a data collection database interface 157.

The network I/O 151 is an input/output device through which a connection or gateway to the communications network 101 is established. In the situation where communications network 101 is a telephone network, the network I/O 151 may be connected to the telephone network through a local access provider (LAP). However, depending on the configuration and access requirements of communications network 101, the network I/O 151 may be directly connected to communications network 101 without need of an LAP for access.

The data monitoring/collection system 152 contains one or more memories in which the call data is collected and stored, according to step 501 of FIG. 5. The function of the data monitoring/collection system 152 may be performed centrally in a communications distribution device 120, or may be performed in a distributed fashion within more than one of the communication processing centers 116–119. In the case of data to be collected in a distributed fashion, the data collection database interface 157 interfaces with the corresponding data monitoring/collection systems 152 of the other communication processing centers to finally gather the collected call data to a central location. In addition to memories for storage, the data monitoring/collection system 152 may also be configured with a controller for controlling the collection, categorizing, formatting, storage and like operations of call data. The format of call data to be collected and stored is as previously described in conjunction with FIG. 6.

The allocation determinator 153 generates the destination plan for routing calls to one of communication processing centers 116–119. As further described above, the destination plan is generated based on historical call volume data and predefined operational constraints. The memory 154 may store operating programs for controlling the communications distribution device 120 and may be used for storage of call data.

The routing plan database 155 stores the destination plan calculated by the allocation determinator 153. The controller 156 uses the destination plan stored in the routing plan database 155 to route calls to the appropriate one of communication processing centers 116–119, as per step 503 of FIG. 5. The controller 156 also serves to control the overall operation of the communications distribution device 120.

The preferred embodiment of the allocation determinator 153 uses linear programming to generate the most efficient destination plan for routing calls. Any program, language or any linear programming program equivalent capable of solving for an optimal result given a set of baseline constraints, may be used to maximize the smallest free capacity. For instance, the linear program may be implemented as a computer program on AMPL™, or may be implemented directly in CPLEX™, or may be implemented in MINOS™. AMPL™ is a computer language used to construct linear, piece-wise linear, quadratic, integer and binary mathematical programming models. AMPL™ uses a syntax that resembles regular mathematical notations and prepares input in format recognized by the solvers. CPLEX™ and MINOS™ are examples of solvers that perform the optimization algorithm.

Figure 16:
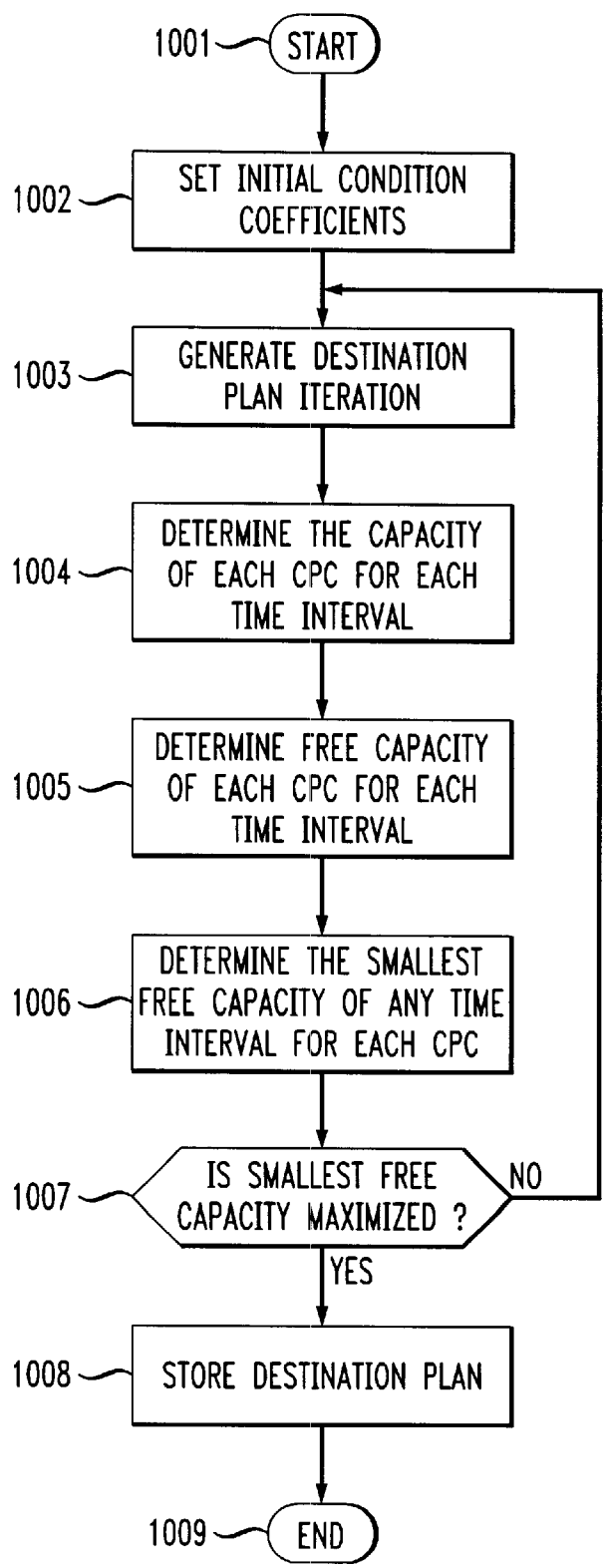
FIG. 16 is an exemplary flowchart for routing incoming communications to communication processing centers.

FIG. 16 is an exemplary flowchart of the method for generating the destination plan for a group of communication processing centers 116–119. In step 1002 the controller 156 sets proposed initial condition coefficients and assignment constraints, commands the allocation determinator 153 to generate the destination plan, and goes to step 1003. In step 1003, the allocation determinator 153 generates a destination plan in which each segment of the predetermined category (e.g., each NPA) is assigned to a communication processing center 116–119. This assignment is made based on the initial condition coefficients as well as assignment constraints. Then the process goes to step 1004. In step 1004, the allocation determinator 153 generates the capacity of each communication processing center 116–119 for each time interval t ($1 \leq t \leq T$). This capacity is determined based on the initial condition coefficients which include, for instance, staffing levels, shift length and performance objectives such as the maximum allowable mean time-to-answer and target maximum amount of abandoned calls. Then the process goes to step 1005. In step 1005 the allocation determinator 153 calculates each communication processing center's free capacity for each time interval t ($1 \leq t \leq T$) based on equation (2), for example. Then the process goes to step 1006. In step 1006, the allocation determinator 153 calculates the smallest free capacity for each communication processing center 116–119, and the process goes to step 1007. In step 1007, the allocation determinator 153 whether the value of the smallest free capacity from step 1006 has been maximized. If maximized, the allocation determinator 153 goes to step 1008; otherwise the allocation determinator 153 returns to step 1003. In step 1008, the allocation determinator 153 stores the destination plan in the routing plan database 155, and the process ends at step 1009. The steps 1003 to 1007 can be performed by a mathematical programming algorithm such as the linear programming algorithm. Linear programming algorithms are used in solvers such as CPLEX™ and MINOS™.

Figure 17:
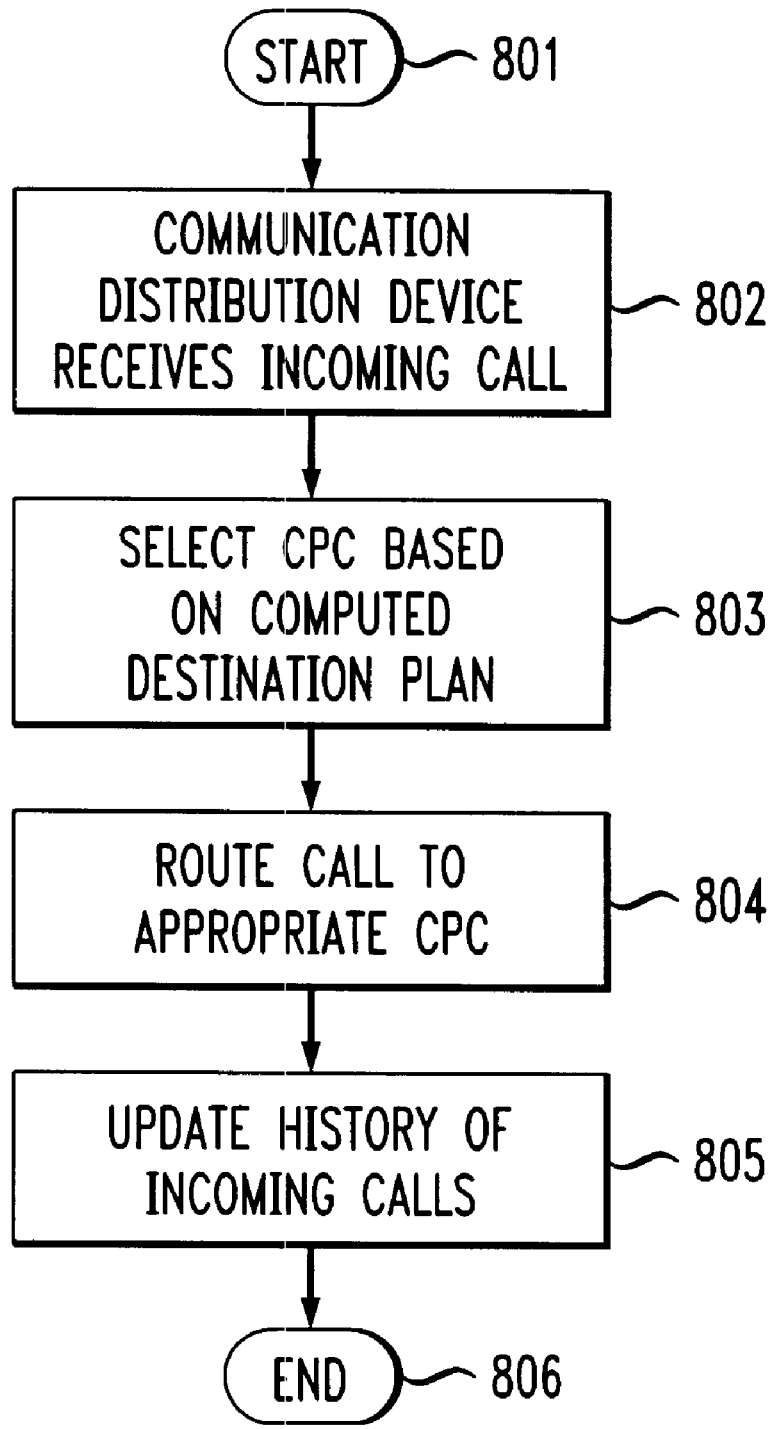
FIG. 17 is an exemplary flowchart for developing a destination plan.

FIG. 17 is an exemplary flowchart for routing calls such as incoming signal 113 to communication processing centers 116–119 based on the destination plan. In step 802, the controller 156 through the network I/O 151 receives the call from one of the user terminals 114 and goes to step 803. In step 803, the controller 156 extracts call identification information (e.g., phone number or header information) from the incoming signal 113, retrieves from the routing plan database 155 the percentage of calls to be allocated to various communication processing centers 116–119, and retrieves from the data monitoring/collection system 152 the present status concerning the percentage of calls for the predetermined category of interest that has been routed. The controller 156 uses the above information to select the next one of communication processing centers 116–119 which is to receive a call. For example, the controller 156 may be a weighted round-robin scheme where each of the communication processing centers 116–119 that may receive calls of the particular predetermined category are assigned a number corresponding to the percentage specified by the destination plan. When routing a call, the controller 156 keeps track of the number of calls that each of the communication processing centers 116–119 has received and sends calls to each successive one of the communication processing centers 116–119 until the number of calls equals the assigned number and then moves on to the next one of the communication processing centers 116–119. Then the controller 156 goes to step 804. In step 804, the controller 156 routes the call to the selected communication processing center 116–119, and goes to step 805. Finally, in step 805, the data monitoring/collection system 152 stores appropriate data of the call in order to update the call volume history for later use in developing a new destination plan based on updated data, and update the status of call routing so as to route the next incoming signal 113 to the next one of the communication processing centers 116–119. Then the process goes to step 806 and ends.

While the invention has been described in relation to preferred embodiments, many modifications and variations are apparent from the description of the invention. All such modifications and variations are intended to be within the scope of the present invention as defined in the appended claims.

What is claimed is:

1. A method for operating a plurality of communication processing centers comprising:

modeling a free capacity for each of the communication processing centers using linear relationships among incoming communication data and a set of initial condition constraints and assignment constraints for the communication centers;

generating a planned incoming communication volume for each of the communication processing centers that maximizes a lower bound z for a free capacity for each of all the communication processing centers, the planned incoming communication volume including an incoming communication volume corresponding to a plurality of predetermined communication grouping categories;

generating a predetermined destination plan prior to receiving the incoming communications for routing the incoming communications to the communication processing centers, wherein the predetermined destination plan preserves only binary associations between incoming communications and the plurality of predetermined communication grouping categories;

storing the destination plan in a database; and routing the incoming communications to the communication processing centers according to the stored destination plan.

2. The method of claim 1, wherein the predetermined categories include at least one of area code, zip code, income level, dialect and geographic location.

3. The method of claim 1, wherein the set of constraints includes at least one of:

a total number of communication processing centers J;

a maximum communication volume corresponding to each of the communication processing centers $B_j$ where j is an index indicating a particular one of the communication processing centers, j having integer values in the range of $1 \leq j \leq J$;

a time interval T where time $t \in T$;

a set of the predetermined categories I where i is an index indicating a particular one of the set of the predetermined categories, i having integer values in the range of $1 \leq i \leq I$; and an assignment $x_{ij}$ of incoming communications from one of the set of predetermined categories i for one of the communication processing centers j, $x_{ij}$ having a value in the range of $0 \leq x_{ij} \leq 1$, where 0 indicates forbidden assignment, 1 indicates complete assignment, and other values indicates a fraction assignment, i and j having at least one of the integer values of $1 \leq i \leq I$ and $1 \leq j \leq J$, respectively.

4. The method of claim 1, wherein the modeling step models the free capacity $y_{jt}$ as:

$$y_{jt} = 1 - \sum_{i=1}^{I} [(A_{it}x_{ij})/B_j]$$

where $1 \leq j \leq J$ and $t \in T$.

5. The method of claim 3, wherein one of the set of constraints includes a cost $C_{ij}$ and the destination plan accounts for the cost by maximizing a value:

$$z - W \sum_j \left( \sum_i \left( x_{ij} \sum_t A_{it} \right) C_{ij} \right)$$

where $1 \leq j \leq J$, $1 \leq i \leq I$, $t \in T$, and W is a weight assigned for the importance of the cost.

6. An apparatus for operating a plurality of communication processing centers, comprising:

an allocation determinator for modeling a free capacity for each of the communication processing centers using linear relationships among the incoming communication data and a set of initial condition constraints and assignment constraints, and generates a planned incoming communication volume for each of the communication processing centers that maximizes a lower bound z for the free capacity for all the communication processing centers, the planned incoming communication volume including an incoming communication volume corresponding to a plurality of predetermined communication grouping categories, and generates a predetermined destination plan for routing incoming communications to the communications processing centers, the destination plan being generated prior to receiving the incoming communications, wherein the predetermined destination plan preserves only binary associations between incoming communications and the plurality of predetermined communication grouping categories;

a routing plan database for storing the destination plan; and a controller for routing the incoming communications to the communication processing centers according to the stored destination plan.

7. The apparatus of claim 6, further comprising:

a data collection and monitoring system for collecting incoming communication volume data for each of the groups and for tabulating the incoming communication volume data based on selected time intervals and groups potential incoming communications into a plurality of groups based on predetermined categories.

8. The apparatus of claim 6, wherein the predetermined categories include area code and geographic location.

9. The apparatus of claim 6, wherein the set of constraints includes:

a total number of communication processing centers J;

a maximum communication volume corresponding to each of the communication processing centers $B_j$ where j is an index indicating a particular one of the communication processing centers, j having values in the range of $1 \leq j \leq J$;

a time interval T where time $t \in T$;

a set of the predetermined categories I where i is an index indicating a particular one of the set of the predetermined categories, i having values in the range of $1 \leq i \leq I$;

an assignment $x_{ij}$ of incoming communications from one of the set of predetermined categories i for one of the communication processing centers j, $x_{ij}$ having a value in the range of $0 \leq x_{ij} \leq 1$, where 0 indicates forbidden assignment and 1 indicates complete assignment and other values indicates a fraction assignment; and an incoming communication volume $A_{it}$ from one of the set of predetermined categories i for $t \in T$.

10. The apparatus of claim 6, wherein the modeling step models the free capacity $y_{jt}$ as:

$$y_{jt} = 1 - \sum_{i=1}^{I} [(A_{it}x_{ij})/B_j]$$

where $1 \leq j \leq J$ and $t \in T$.

11. The apparatus of claim 9, wherein one of the set of constraints includes a cost $C_{ij}$ and the destination plan accounts for the cost by maximizing a value:

$$z - W \sum_j \left( \sum_i \left( x_{ij} \sum_t A_{it} \right) C_{ij} \right)$$

where $1 \leq j \leq J$, $1 \leq i \leq I$, $t \in T$, and W is a weight assigned for the importance of the cost.

* * * * *